(12) United States Patent
Wu et al.

(10) Patent No.: US 12,155,761 B2
(45) Date of Patent: Nov. 26, 2024

(54) METHOD AND SYSTEM FOR ACCELERATING VERIFICATION PROCEDURE FOR IMAGE FILE

(71) Applicant: REALTEK SEMICONDUCTOR CORP., Hsinchu (TW)

(72) Inventors: Shiue-Ru Wu, Hsinchu (TW); Ching-Tung Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 264 days.

(21) Appl. No.: 17/324,241

(22) Filed: May 19, 2021

(65) Prior Publication Data
US 2021/0367781 A1  Nov. 25, 2021

(30) Foreign Application Priority Data
May 20, 2020 (TW) ................. 109116620

(51) Int. Cl.
*H04L 29/06* (2006.01)
*H04L 9/30* (2006.01)
*H04L 9/32* (2006.01)

(52) U.S. Cl.
CPC .............. *H04L 9/30* (2013.01); *H04L 9/3236* (2013.01); *H04L 9/3247* (2013.01)

(58) Field of Classification Search
CPC ....... H04L 9/30; H04L 9/3236; H04L 9/3247; H04L 9/3223; H04L 9/32; H04L 9/3239; H04L 9/006; H04L 9/06; H04L 9/0643; H04L 9/08; H04L 9/0813; H04L 9/0816; H04L 9/0819; H04L 9/0825; H04L 9/083; H04L 9/0844; H04L 9/088; H04L 29/06714; H04L 29/06721; H04L 63/12; H04L 63/0442; H04L 63/061; H04L 63/062; H04L 2463/062; H04H 60/23; H01J 2237/221; H04M 2215/0156; H04N 2201/3233; H04N 21/443; H04W 12/0401; H04W 12/04031; H04W 12/04033; H04W 12/04071; H04W 12/041; H04W 12/0431; H04W 12/0471; G01M 11/065; G01N 2203/0647; G03G 15/087; G06T 7/00;

(Continued)

(56) References Cited

U.S. PATENT DOCUMENTS 10,223,294 B2   3/2019  Soja et al.
2006/0248348 A1 11/2006 Wakao et al.

(Continued)

*Primary Examiner* — Wasika Nipa
*Assistant Examiner* — Leynna Truvan
(74) *Attorney, Agent, or Firm* — Li & Cai Intellectual Property (USA) Office

(57) ABSTRACT

A method and a system for accelerating verification procedure for an image file are provided. In the method, the system retrieves an image file from a first non-volatile memory, and calculates a hash value with respect to the image file. A combination of the hash value, a public key and a digital signature is compared with another hash value, public key and digital signature backup in a second non-volatile memory. A comparison result is generated for verifying the image file in the first non-volatile memory. After the image file is verified, the system can load the image file. Instead of the conventional technology that uses digital signature to verify the image file, the present method can effectively accelerate the verification procedure.

16 Claims, 8 Drawing Sheets

(58) Field of Classification Search
CPC ... G06T 1/00; G06T 1/0021; G06T 2201/005; G06T 2201/0061; G06T 2201/0203; G06F 2212/455; G06F 2212/464; G06F 9/4408; G06F 11/1417; G06F 21/575; G06F 2211/1097; G06F 16/137; G06F 17/3033; G06F 2211/008; G06F 2221/0751; G06K 9/00; G06K 9/00114; G06K 9/00744; G05B 2219/13062; G05B 2219/24161; G05B 2219/23309; G06V 20/46; G07B 2017/0075; G07B 2017/00758; G07B 2017/00846; G07B 2017/00854; G07B 2017/00862; G07B 2017/0087; G07B 2017/00895; G11B 20/0898; G11B 20/00289; G11B 20/005114; G06Q 2250/057; G07C 2009/00388

See application file for complete search history.

(56) References Cited

U.S. PATENT DOCUMENTS

| | | |
|---|---|---|
| 2013/0290694 A1 | 10/2013 | Civilini et al. |
| 2016/0246608 A1* | 8/2016 | Newham ............. G06F 12/0246 |
| 2019/0042765 A1* | 2/2019 | Chung ................. G06F 21/575 |

* cited by examiner

METHOD AND SYSTEM FOR ACCELERATING VERIFICATION PROCEDURE FOR IMAGE FILE

CROSS-REFERENCE TO RELATED PATENT APPLICATION

This application claims the benefit of priority to Taiwan Patent Application No. 109116620, filed on May 20, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is related to a method for verifying an image file, and more particularly to a method for accelerating verification procedure for image file, and a system thereof that are used to verify hash value, public key and digital signature for ensuring the accuracy of the image file.

BACKGROUND OF THE DISCLOSURE

A framework of a system on chip (SoC) includes an embedded system that is usually in a form of a firmware image stored in a flash memory. When the SoC starts to operate, a booting program loads the firmware image from the flash memory to the embedded system. For ensuring that the firmware is from a secure and trustworthy party, in conventional technology, the firmware can be verified by a digital signature during the loading process.

FIG. 1 is a schematic diagram depicting a hardware framework of an embedded system in one embodiment of the disclosure. A system 10 shown in the diagram is such as a framework of system on chip. Main circuit components of the system 10 include a processor 101, a read-only memory (ROM) 102, a static random-access memory (SRAM) 104, a peripheral device 107 and a storage 106. The system may need an external flash memory 110 that requires a flash controller 105. The flash memory 110 is used to store the firmware image file that can be the booting image required by the system 10, or the program codes for the system 10 to execute. The mentioned circuit components are electrically interconnected via a bus.

The embedded system of the present example further includes a one-time programming memory (OTP) 103. The one-time programming memory 103 can only be written once, and has limited storage space that is only used to store critical data due to its high cost. For example, a secret key used for verification purpose can be stored to the one-time programming memory 103. Nevertheless, the critical data may still be stored to another memory such as an additional flash memory 110.

A secure booting procedure of an embedded system firstly initializes hardware of the system after starting up the system. A power source, a clock, a memory controller and peripheral devices can be generally initialized. After that, a booting program stored to a read-only memory (ROM) is executed, the booting program verifies a firmware image file stored to a specific memory such as the flash memory 110 of FIG. 1. This verification procedure is used to ensure that the image file loaded to the system is from a trustworthy party. The verification is generally based on an algorithm using a digital signature.

FIG. 2 shows a flow chart describing a procedure of verifying a firmware image file in the verification procedure of a conventional booting procedure.

In step S201, a hash algorithm is used to calculate a hash value with respect to a public key of the firmware image file. The hash value is used to compare a pre-stored public key hash value. In step S203, the booting program determines whether or not the two hash values are consistent. If the values are inconsistent, such as step S215, the verification procedure fails. If the values are consistent, the public key is successfully verified. Next, in step S205, an algorithm is used to calculate the hash value of the image file. In step S207, after comparing the image hash value with the pre-calculated and stored image hash value, a comparison result is provided for the booting program to determine if the image file is successfully verified.

If a comparison result indicates that the two hash values are inconsistent, such as in step S215, the verification of the firmware image file fails. Conversely, if the comparison result indicates that the two hash values are consistent, step S209 is then executed, and a digital signature with respect to the firmware image file is then verified. In the method for verifying the digital signature, once the accuracy of the public key has been confirmed, the firmware image file is found to be not tampered with; then, the verified public key and the hash value of the firmware image file are used to verify the digital signature. If the verification of the digital signature fails, such as in step S215, the verification of the image file fails.

Conversely, in the step S211, when the digital signature of the image file is successfully verified, the verification of the image file succeeds (step S213). After that, the image file can be loaded to the embedded system, and the content of the image file is then loaded to an extra memory, e.g., the SRAM 104, of the embedded system. The content of the memory, e.g., the flash memory 110 of FIG. 1, can be executed directly therein, i.e., a process of execution in place (XIP), without being loaded to the system memory. Furthermore, under utmost security, an additional accuracy check is usually performed on the firmware when the firmware image file has been completely loaded to the system.

The digital signature algorithm commonly used to verify the firmware image file can be, but not limited to, an RSA digital signature algorithm, an elliptic curve digital signature algorithm (ECDSA), or an Edwards-curve digital signature algorithm (EdDSA). The hash algorithm can be selected from non-cryptographic hash functions and keyed/unkeyed cryptographic hash functions such as MD5, SHA-1, SHA-2 and HMAC.

The system that requires higher security level often adopts a digital signature algorithm for verifying the firmware image to be loaded. However, the higher security level the digital signature algorithm requires, the more computations the digital signature algorithm needs to verify the digital signature. Therefore, a booting procedure needs longer time to verify the firmware image. With some devices such as a video surveillance device or an electronic doorbell, only a very short time is allowed from a booting stage to a working stage thereof, so as to make it difficult for such devices achieve both a fast booting speed and safe system security. Thus, for the systems requiring fast booting, system security may be ignored in favor of using the algorithm with a lower security level to verify the firmware image file.

SUMMARY OF THE DISCLOSURE

For achieving both high security and high speed verification of an image file, a method for accelerating verification procedure for the image file, and a system thereof are provided. In an aspect of the method for accelerating verification procedure for image file, an image file is retrieved from a first non-volatile memory, and a hash algorithm is performed on all or a part of the image file so as to generate an image hash value. A combination of the image hash value, a public key and a digital signature corresponding to the image file is used to compare with another combination of a backup image hash value, a backup public key and a backup digital signature stored in a second non-volatile memory. The comparison is used to verify the image file stored in the first non-volatile memory. The image file can be a firmware, a program or a file that is required by a system to perform a procedure. The first non-volatile memory can be an external storage device connected with the system, and the second non-volatile memory can be a non-volatile memory inside the system.

Further, if a comparison result indicates that the image hash value, the public key and the digital signature stored in the first non-volatile memory and the backup image hash value, the backup public key and the backup digital signature stored in the second non-volatile memory are consistent, and the calculated hash value of the image file is consistent with the backup image hash value, it indicates that the image file is successfully verified and the system is allowed to load the image file.

When the image file is successfully verified, a booting procedure of the system takes over the procedure to load the image file. The booting procedure is therefore completed.

Preferably, the backup image hash value, the backup public key and the backup digital signature stored in the second non-volatile memory constitute a fast validation data that is calculated to form an authentication code stored to the second non-volatile memory. The same algorithm uses the image hash value, the public key and the digital signature stored in the first non-volatile memory to calculate another authentication code that is compared with the authentication code stored in the second non-volatile memory so as to produce a verification result.

Further, if the comparison result indicates that the image hash value, the public key and the digital signature stored in the first non-volatile memory and the backup image hash value, the backup public key and the backup digital signature stored in the second non-volatile memory are inconsistent, a conventional procedure using the digital signature to verify the image file is still performed.

Still further, in an aspect of the disclosure, if the image file is successfully verified by a conventional verification procedure, the image file is loaded to the system, and the backup image hash value, the backup public key and the backup digital signature stored in the second non-volatile memory are updated.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
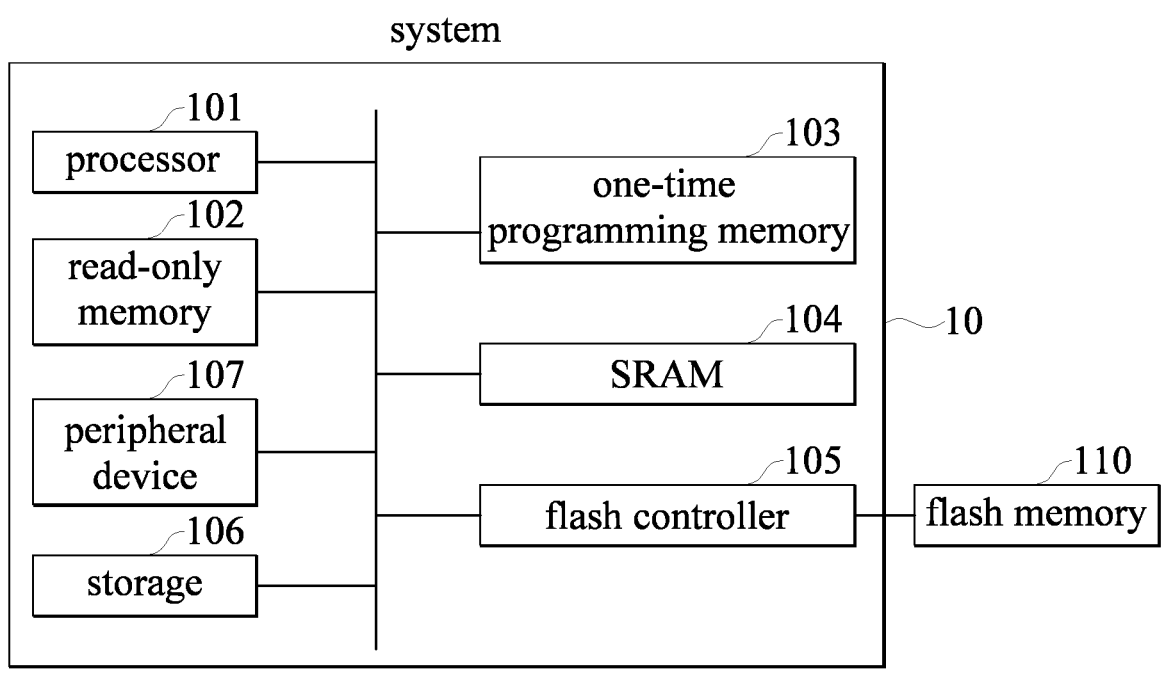
FIG. 1 is a schematic diagram depicting a hardware framework of a conventional embedded system.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a method for accelerating a verification procedure for image file and a system. The method is adapted to a system that requires verifying a specific program, a file or a firmware. The system is such as a system on chip (SoC). The method can effectively accelerate the procedure, e.g., a booting procedure running in the system. For a more complicated system, e.g., a system on chip with multiple booting procedures, the method can obviously accelerate the booting procedures. The method and the system are applicable to any system that requires verifying a firmware, a program or a file.

An embedded system such as the above-mentioned SoC and an electronic device having the embedded system may encounter various threats, such as the data stored in an external storage device (e.g., the flash memory 110 of FIG. 1) may be tampered. For example, a hacker may use a malware to replace a normal firmware in the device, and therefore can intrude the system and steal confidential data. One of tactics to defend from the threats is to verify the image file configured to be loaded to the system during the booting procedure or before starting a specific procedure. The system can be successfully booted or the program can be correctly executed once the image file is confirmed not to be tampered.

Figure 3:
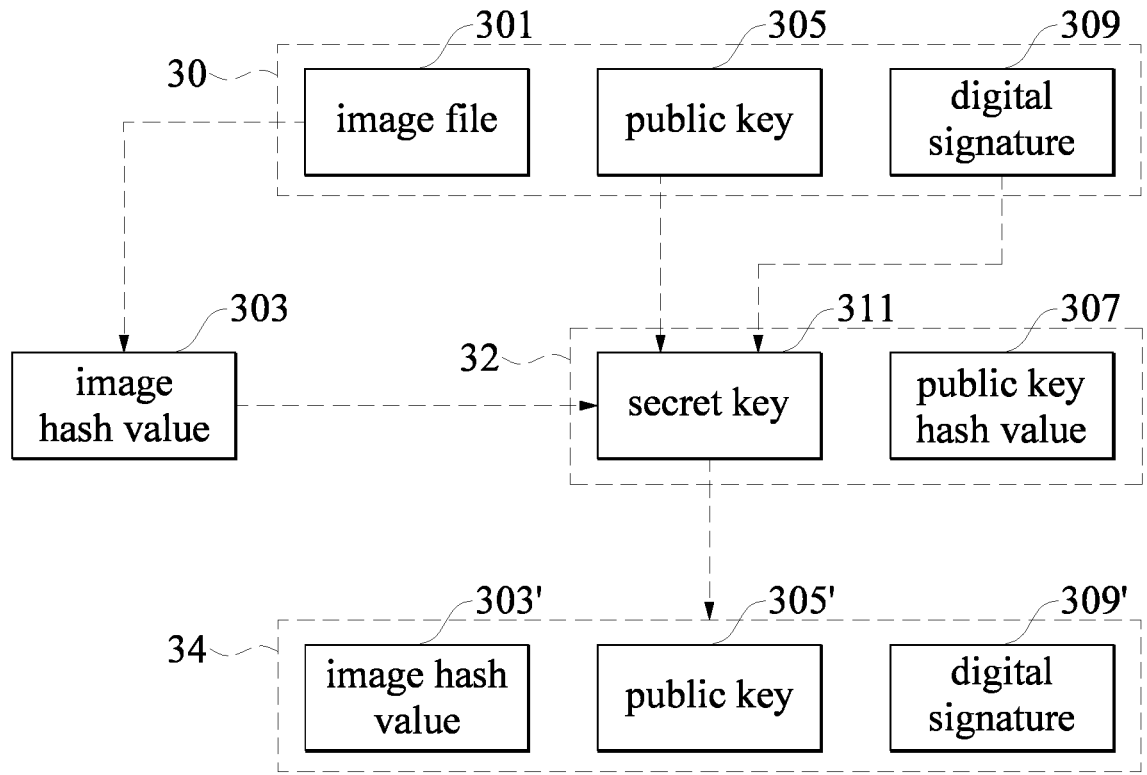
FIG. 3 is a technical conceptual diagram describing a fast verification procedure for image file.

The method and the system of the disclosure can meet the requirements of high security and fast booting. Reference is made to FIG. 3, which shows a conceptual diagram depicting the method for accelerating verification procedure for image file. In the system employing the method, various storages may be used. The storage can be a first non-volatile memory 30, a second non-volatile memory 34 or a one-time programming memory (OTP) 32.

Any issuance of the firmware image file is accompanied by a digital signature signed using a private key by an issuer. In the present example, an image file 301 can be an image file of a program, a file or a firmware, which is stored to a specific storage media with a digital signature 309 that is used to verify the image file 301. The storage media is a non-volatile memory (NVM) such as a flash memory, e.g., the first non-volatile memory 30 of FIG. 3. The image file 301 is to be verified after system is activated. The digital signature 309 is used to ensure that the image file 301 is from a trustworthy party. According to one embodiment of the disclosure, the first non-volatile memory 30 or a specific storage device can be used to store a public key 305 that is used to verify the digital signature 309.

In an aspect of the method for accelerating verification procedure for image file, a hash algorithm is performed on the image file 301 so as to generate an image hash value 303. The image hash value 303, the public key 305 and the digital signature 309 used for verifying the image file 301 are backed up and stored to a non-volatile memory of the system. The non-volatile memory is such as the second non-volatile memory 34 that includes the backup image hash value 303', the backup public key 305' and the backup digital signature 309'. In one embodiment of the disclosure, a public key hash value 307 is calculated from the public key 305 via a hash algorithm, and stored to the one-time programming memory 32 of the embedded system. When the system uses the public key 305 to verify the digital signature 309, the public key hash value 307 can be used to verify the public key 305 and determine whether or not the public key 305 is tampered.

In one further embodiment of the disclosure, while storing the backup data (303', 305', 309'), an encryption process using a secret key 311 can be used to protect the backup image hash value 303', the backup public key 305' and the backup digital signature 309'. The secret key 311 can be stored to the one-time programming memory 32 that can only be read by a trustworthy program. It should be noted that the data (303', 305', 309') stored in the second non-volatile memory 34 forms a fast validation data.

Figure 4:
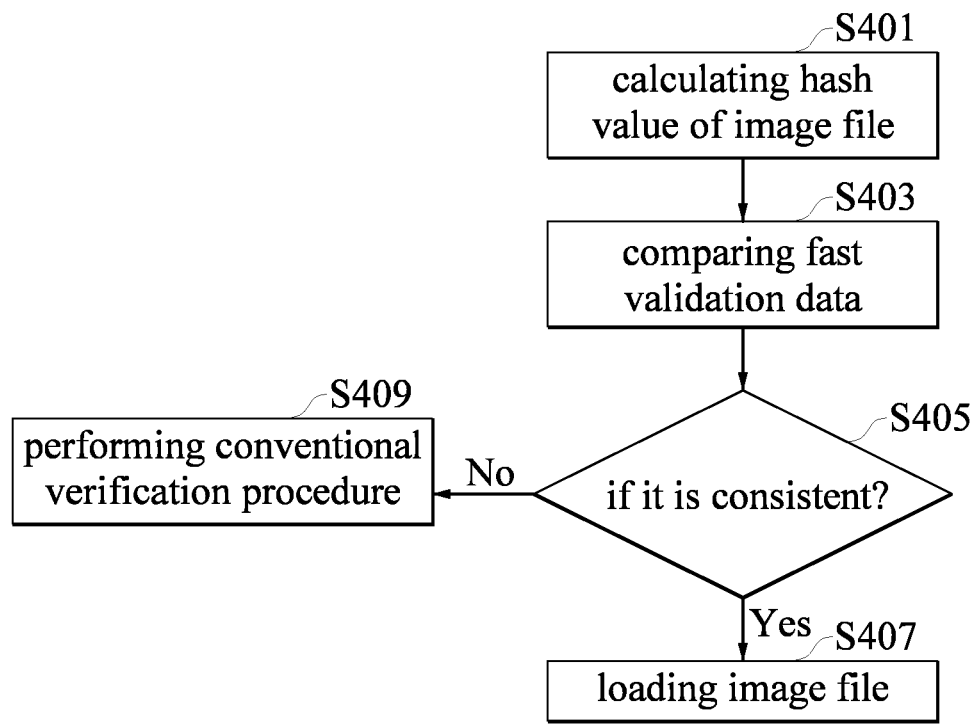
FIG. 4 shows a flow chart describing a method for accelerating verification procedure for image file according to one embodiment of the disclosure.

The above-mentioned procedure prepares the backup data (303', 305', 309') of the hash value 303, the public key 305 and the digital signature 309 to be ready for the method for accelerating verification procedure for image file. The backup data can be encrypted by an encryption algorithm using the secret key 311 and then stored to the second non-volatile memory 34 so as to form the fast validation data. In a booting procedure of the system or to initiate a specific procedure, the method for accelerating verification procedure for image file is performed. In the method, the fast validation data can be decrypted and used to verify the hash value, the public key and the digital signature of the image file to be loaded. FIG. 4 shows the flow chart describing the method in one embodiment of the disclosure.

The method is operated before the system starts to load the image file of the firmware, program or file. The system needs to perform a verification procedure for verifying the image file. The processor of the system performs an initiation program such as the booting program or a program used to perform a specific procedure for operating the verification procedure to verify the image file 301.

In the beginning, the image file 301 is retrieved from the first non-volatile memory 30, and the image hash value 303 is calculated from the image file 301 by a hash algorithm (step S401). The hash value, the public key 305 and digital signature 309 that are used to verify the image file 301 are used to compare the fast validation data stored to the second non-volatile memory 34 (step S403) for determining whether or not the image file 301 and the fast validation data are consistent (step S405). If necessary, the secret key 311 is retrieved from the one-time programming memory 32 and the backup image hash value 303', the backup public key 305' and the backup digital signature 309' are retrieved from the fast validation data after decryption. The backup image hash value 303', the backup public key 305' and the backup digital signature 309' are used to verify the image hash value 303, the public key 305 and the digital signature 309 stored to the image file 301 of the first non-volatile memory 30.

When the image hash value 303, the public key 305 and the digital signature 309 are consistent with the fast validation data, it indicates that the image file 301 is verified. At the same time, the accuracy of the digital signature 309 used to verify the image file 301 and the public key 305 used to verify the digital signature 309 can be confirmed. The image file 301 can be directly loaded to the system (step S407). In one embodiment of the disclosure, when the system has verified the image file 301, the verification procedure is taken over by a booting procedure so as to load the image file and a booting procedure is completed.

Figure 2:
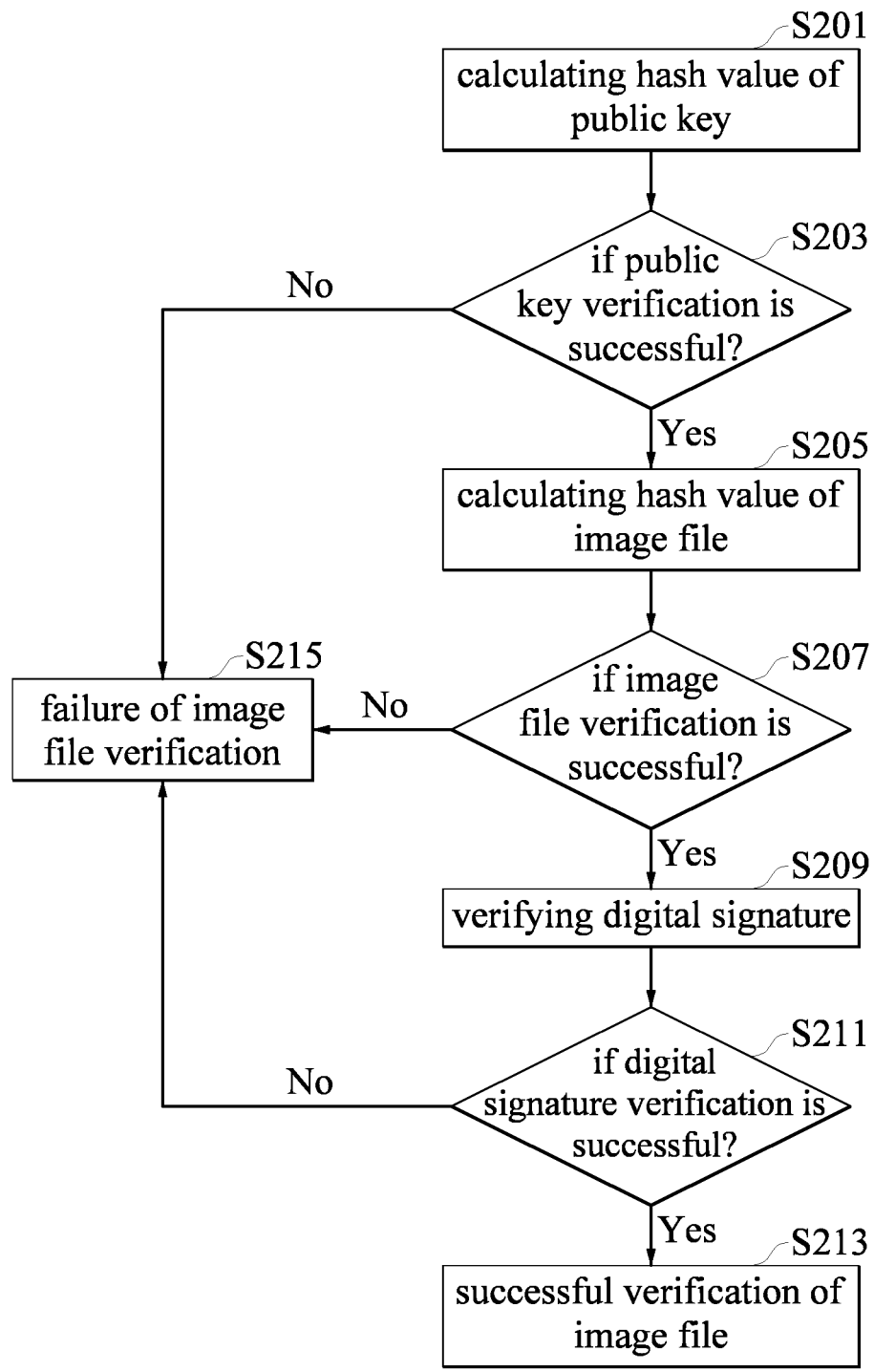
FIG. 2 shows a secure booting procedure of a conventional embedded system.

On the contrary, if the image hash value 303 of the image file 301, the public key 305, the digital signature 309, or the image file 301 is tampered, the system can detect this error in the fast verification process of the booting procedure or the specific procedure, and the verification process of the image file may return to the original method, i.e., using the digital signature to verify the image file. The system security can still be maintained in the conventional procedure, such as in step S409, the image file 301 stored in the first non-volatile memory 30 can be verified by a conventional digital signature algorithm if it is determined that the verification process fails because any of the image hash value 303 of the image file 301, the public key 305 and the digital signature 309 is inconsistent with the backup data in the second non-volatile memory 34 (step S405). The verification procedure is used to ensure that the image file is from a trustworthy party (e.g., step S205 of FIG. 2) (step S409).

In step S409, when the process goes back to the conventional verification procedure, the public key 305 is retrieved after the accuracy of the public key 305 has been verified.

The steps for verifying the public key 305 include obtaining the public key 305 corresponding to the image file 301 from the first non-volatile memory 30, calculating a hash value of the public key 305, and comparing the hash value with the public key hash value 307 stored in the one-time programming memory 32 so as to confirm the accuracy of the public key 305. The verified public key 305 is needed for the verification of the digital signature 309, in which the conventional digital signature algorithm is used to verify the digital signature 309 corresponding to the image file 301 and confirm the accuracy of the digital signature 309, and the image file 301 is loaded to the system.

It should be noted that the main reference provided for accelerating verification of the image file is the fast validation data that is consisting of the backup image hash value 303', the backup public key 305' and the backup digital signature 309' stored in the second non-volatile memory 34. The fast validation data is encrypted and stored to a memory. Another aspect that the fast validation data uses to ensure the accuracy of the image file is to calculate the fast validation data and form an authentication code such as a keyed-hash message authentication code (HMAC). The authentication code is stored to the second non-volatile memory 34 and used as a reference for verification. The second non-volatile memory 34 is such as the storage 106 of FIG. 1. While the fast validation data is verified, the same algorithm is used to calculate another authentication code according to the image hash value 303, the public key 305 and the digital signature 309 stored in the first non-volatile memory 30. The another authentication code can be another keyed-hash message authentication code that is used to compare the keyed-hash message authentication code stored in the second non-volatile memory 34, such that a verification result is generated.

In the method for accelerating verification procedure for image file according to one embodiment of the disclosure, the above-mentioned verification procedure can be used to replace the complicated conventional digital signature algorithm for saving the time to verify the digital signature. Therefore, the method is able to accelerate the verification procedure in a specific procedure to be performed in the system, for example, accelerating the booting procedure. It should be noted that, the fast validation data stored in the second non-volatile memory 34 can be updated only if the image file of the firmware, the program or the file is updated or the system is under attack. Under a normal circumstance, the mentioned fast verification mechanism allows the system to shorten the time to verify the image file so as to safely accelerate the system procedure.

According to one embodiment of the disclosure, the fast validation data and the keyed-hash message authentication code (HMAC) are stored to the second non-volatile memory 34. However, in practical operation, the fast validation data and the HMAC can also be stored to different memories according to requirements. For example, when the fast validation data is encrypted or protected by the keyed-hash message authentication code, the encrypted fast validation data and the code can be stored to the first non-volatile memory 30.

Reference is further made to FIG. 3, in view of the system framework shown in FIG. 1, FIG. 3 is a schematic diagram depicting a system that performs the method for accelerating verification procedure for image file according to one embodiment of the disclosure. The image file 301 is stored to the first non-volatile memory 30 that can be an external storage device connected with the system. The external storage device can be a flash memory 110 shown in FIG. 1.

A hash value with respect to the image file 301 is calculated through a hash algorithm and the hash value is used to verify integrity of the image file 301. The image file 301 is generally accompanied by the digital signature 309. The digital signature 309 is used to determine that the image file 301 is obtained from a trustworthy party. In one embodiment, the public key 305 required to verify the image file 301 can be stored to the flash memory 110. The public key hash value 307 is stored in the one-time programming memory 32 as shown in the embodiment in FIG. 3. When the image file 301 is successfully verified, program codes of the image file 301 are then loaded to the SRAM (104, FIG. 1) of the system, or directly executed in the flash memory 110.

Figure 5:
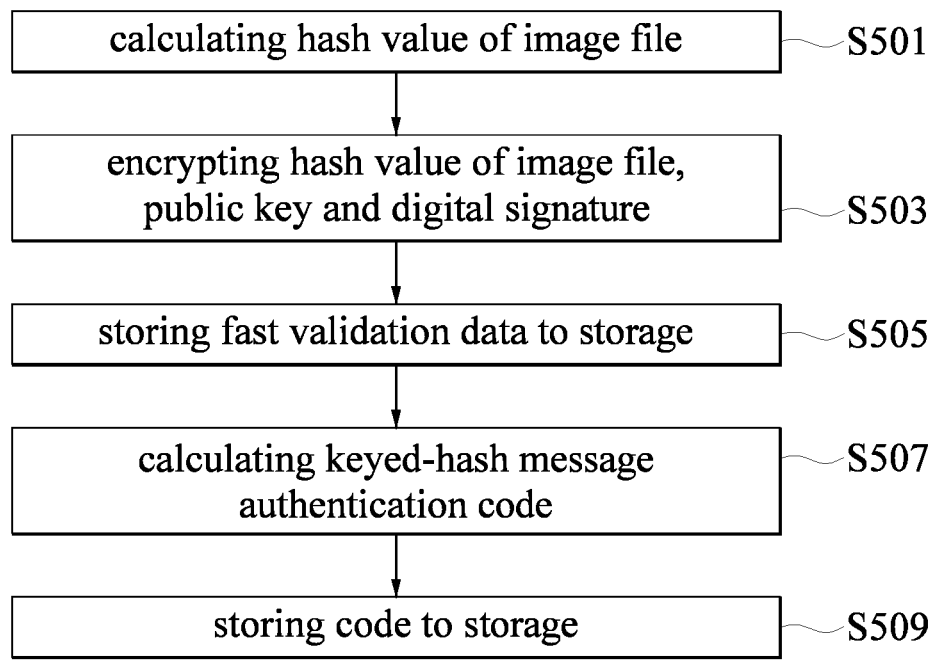
FIG. 5 shows a flow chart describing a process for creating a fast validation data in one embodiment of the disclosure.

FIG. 5 shows a flow chart describing the method for accelerating verification procedure for image file according to one embodiment of the disclosure.

When the image file preset to be loaded to the system is modified, or a new image file is provided, a new trustworthy image file and a corresponding verification value should be established. In an aspect of the disclosure, a hash algorithm can be performed on all or a part of an accurate image file for calculating an image hash value (step S501). It should be noted that, the image hash value can be obtained based on all or a part of the image file, and therefore a corresponding hash value should be used to conduct the verification.

The image hash value, a public key and a digital signature corresponding to the image file can then be encrypted by an encryption algorithm using a secret key (step S503). The encrypted data is then stored as the above-mentioned fast validation data to a specific storage medium such as a non-volatile memory (step S505).

It should be noted that the fast validation data used for verifying the image file can be not the original data. In one of the embodiments, a specific algorithm can further calculate a verification code based on the fast validation data. The verification code is such as the keyed-hash message authentication code (step S507). The verification code is then stored to the storage medium (step S509).

It should be noted that the order of the steps for performing encryption and hash algorithm in the method is not limited to the above embodiments. For example, the keyed-hash message authentication code can be calculated after encrypting the fast validation data. The secret key used in the encryption algorithm can be both the key used to calculate the keyed-hash message authentication code and the key used to calculate the fast validation data. The secret key(s) can be stored to a one-time programming memory of the system. Alternatively, before conducting the calculations, the secret key stored in the one-time programming memory is used to derive the key used for the encryption process. A hardware key can be incorporated to limit the privilege to read the secret key stored in the one-time programming memory. For example, only the program loading the image file in the booting procedure is permitted access to the secret key.

Figure 6:
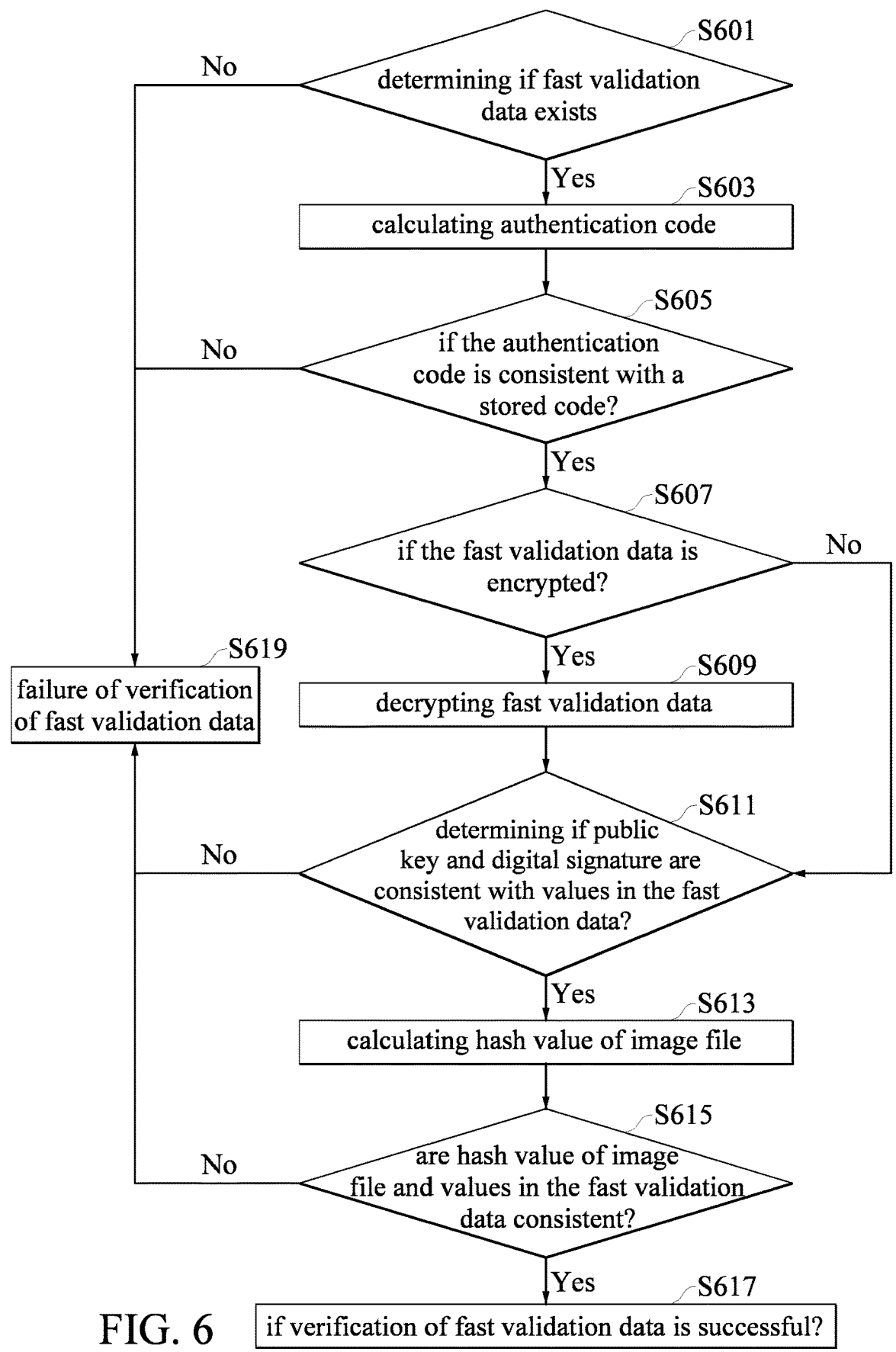
FIG. 6 shows a flow chart describing a process for verifying data integrity in one embodiment of the disclosure.

FIG. 6 shows a flow chart describing a process for confirming that the fast validation data is intact in one embodiment of the disclosure. The main purpose of the process is to verify integrity of the fast validation data in the non-volatile memory of the system. The main portions of the fast validation data are the hash value of the image file to be verified, the public key and the digital signature.

When the system initiates a procedure, such as the booting procedure, or performs a specific procedure, the integrity of the fast validation data should be verified. After the integrity is verified, the fast validation data is confirmed not to be tampered with. In other words, the verification of integrity can be used to fast verify the image file. It should be noted that the procedure for verifying the fast validation data can be performed by a program stored in a read-only memory or a specific memory of the system for ensuring its security.

In the process, firstly, such as in step S601, it is determined whether or not the fast validation data used in the process exists. If the fast validation data does not exist in the storage medium or any external storage medium of the system, the process is then terminated. It also indicates that the verification of the fast validation data fails (step S619).

However, when the fast validation data exists, such as in step S603, then an authentication code used to compare the fast validation data is generated. The authentication code is such as the keyed-hash message authentication code that is calculated from the hash value of the image file, the public key and the digital signature in the storage medium through a specific algorithm.

In the meantime, such as in step S605, the authentication code is used to compare the authentication code pre-stored in a specific memory. A comparison result is referred to for determining whether or not the two authentication codes are consistent. If the two authentication codes are inconsistent, the process terminates and the fast validation data fails (step S619).

If the comparison result indicates that the two authentication codes are consistent, in step S607, a decryption procedure may be performed for decrypting the fast validation data. The decryption procedure may be ignored if no decryption procedure is required. Otherwise, the step S611 is performed if the fast validation data is not encrypted. If it is determined that the fast validation data needs to be encrypted, such as in step S609, the fast validation data is decrypted.

In step S611, a public key and a digital signature can be retrieved from the fast validation data. The retrieved public key and the digital signature are used to verify the public key and the digital signature with respect to the image file. If it is determined that the public keys and the digital signatures are inconsistent, the fast validation data is suspected to be tampered with and the process terminates. Thus, the verification of fast validation data fails (step S619).

On the contrary, if the public keys and the digital signatures are consistent, such as in step S613, the verification of the image file continues. An image hash value is calculated from the image file and used to be compared with a pre-stored image hash value of the fast validation data (step S615). If the two hash values are inconsistent, it indicates that the image file is tampered with and the process terminates (step S619). On the contrary, if the hash values are consistent, such as in step S617, it indicates that the fast validation data has been verified, and the follow-up process for verifying the image file continues.

Figure 7:
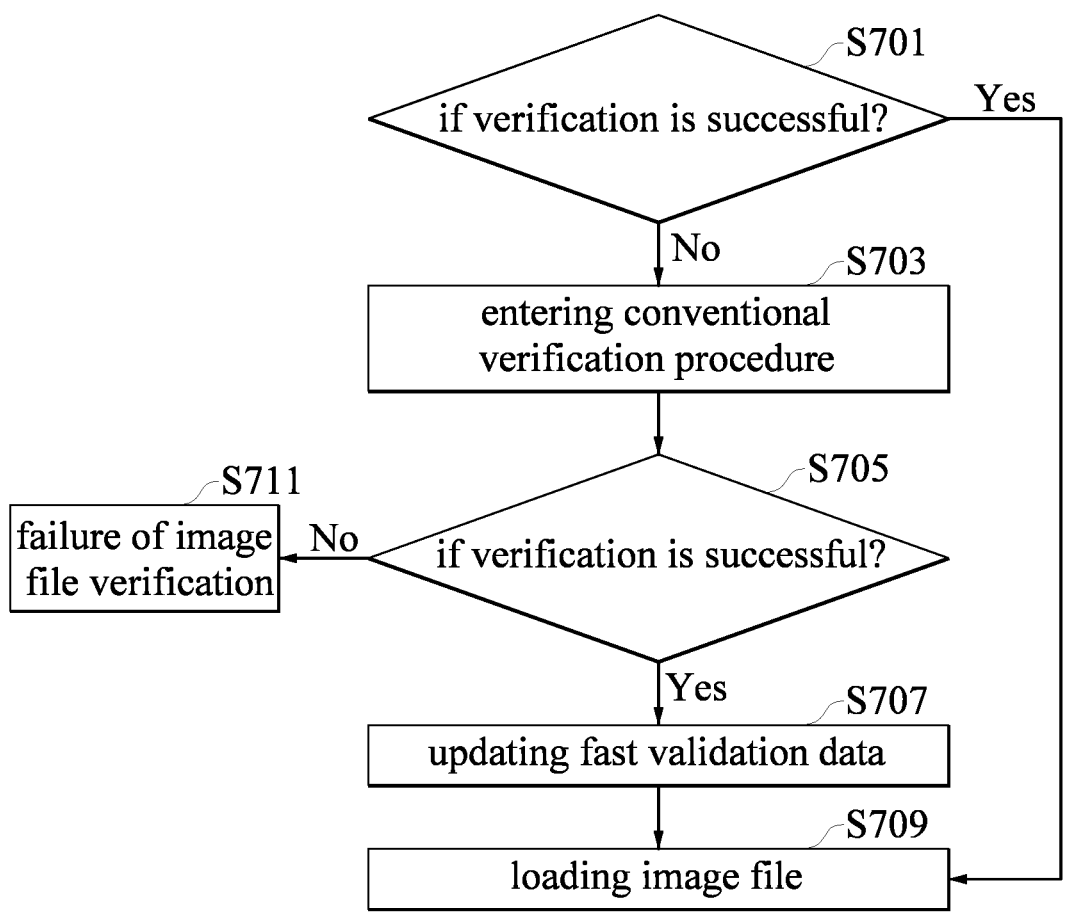
FIG. 7 shows another flow chart describing the method for accelerating verification procedure for image file in another embodiment of the disclosure.

FIG. 7 shows another flow chart describing the method for accelerating verification procedure for image file in one further embodiment of the disclosure. In the method, if any file is found to be tampered or incorrect in the method for accelerating the verification procedure for the image file, the conventional verification procedure is applied to re-establish the fast validation data. The fast validation data can still be used for accelerating the verification for the image file in the next booting procedure if required by the system.

In the present embodiment, in the beginning step S701, the system determines whether or not the method for accelerating verification procedure for image file can successfully verify an image file, in which the fast validation data is used to verify the image file. If the image file can be verified, not only the fast validation data can be updated (step S707), the image file is loaded to the system (step S709). On the contrary, if the method fails to verify the image file, the process goes to the step S703 for escaping from the procedure so as to automatically perform the conventional verification procedure. After that, such as in step S705, the system determines whether or not the image file can be successfully verified.

The conventional verification procedure performs the conventional digital signature algorithm to verify the image file to be loaded. If the image file cannot be verified by the conventional verification procedure, such as in step S711, the image fails to be verified, and a process for the failure of verification is performed; otherwise, the image file can still be loaded to the system such as in step S709 when the conventional verification procedure has verified the image file; or otherwise, the flow is then terminated.

It should be noted that, according to one of the reasons, the conventional verification procedure successfully verifies the image file because the image file was modified by a trustworthy party. For example, by the trustworthy party, the image file is upgraded to a next version, or the bugs are fixed. Therefore, such as in step S707, the fast validation data used to fast verify the image file is updated. Accordingly, the backup image hash value, the backup public key and the backup digital signature stored in the second non-volatile memory are required to be updated and ready for the next verification.

Figure 8:
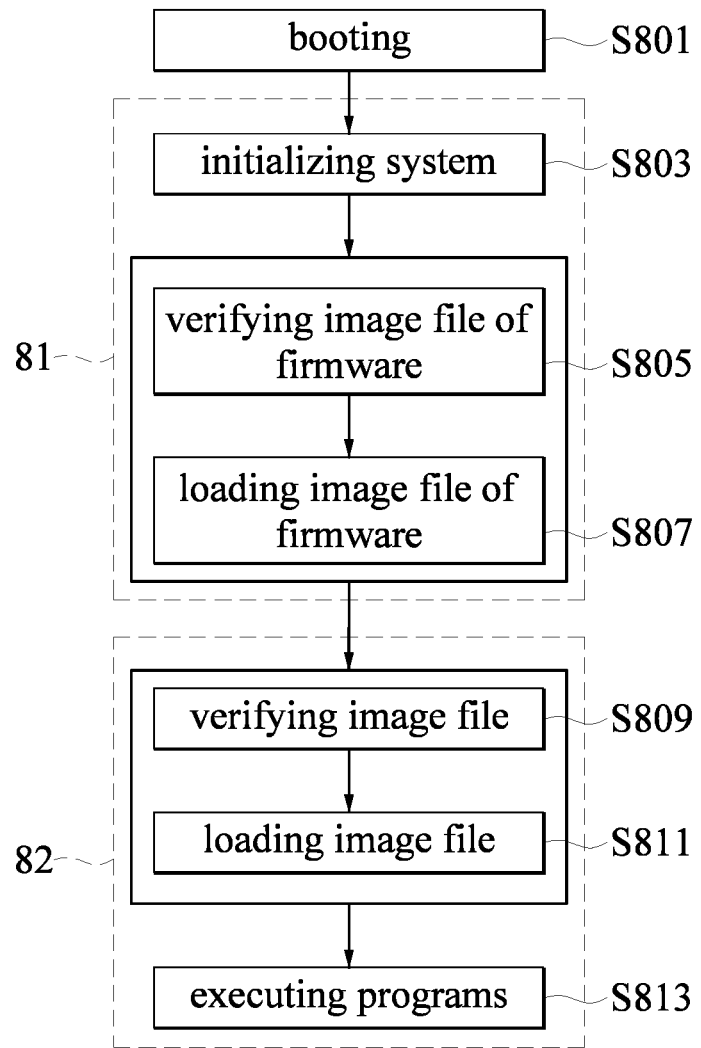
FIG. 8 shows one further flow chart describing the method for accelerating verification procedure for image file in one further embodiment of the disclosure.

FIG. 8 shows a flow chart describing the method for accelerating verification procedure for image file applied to a booting procedure of the system in one embodiment of the disclosure.

The present booting procedure incorporates the above-mentioned method. When the system performs a booting procedure after the system is turned on (step S801). A boot loader operating in the booting procedure firstly performs an initialization process in a read-only memory (ROM) 81 (step S803). The initialization process is to initialize a power supply, a clock, a memory, etc., of the system. Next, such as in step S805, a firmware image file that is required to be loaded to the system is verified. The verification procedure can be referred to the above embodiments. Instead of the conventional verification procedure performed on the digital signature of the image file, the present verification procedure verifies a fast validation data that includes an image hash value (in this example, an image hash value of the firmware image file), a public key and a digital signature that are stored to the storage medium so as to confirm accuracy of the firmware image file. After the verification procedure, such as in step S807, the firmware image file is then loaded to a random access memory (RAM) 82 after the system is booted from the read-only memory.

In the process, another booting program in the RAM 82 is ready to load an image file with respect to a specific program. The image file is verified by comparing a fast validation data that is constituted of an image hash value, a public key and a digital signature (step S809). After the image file has been verified, the image file is loaded to the RAM 82 (step S811). The subsequent steps including performing the loaded programs can be performed (step S813).

In the verification procedure, no matter how much of the firmware, the programs or the files are required in any procedure after the system is turned on, their corresponding image files can be verified as quickly as possible.

In conclusion, according to the above embodiments, the method of the disclosure can be used to accelerate the verification procedure in a system. In a computer procedure, e.g., a booting procedure, the computer procedure is accelerated due to the acceleration of the verification procedure performed on the firmware, such that the booting procedure is accelerated. In an exemplary example, when waking up a system in power-saving mode, the above-mentioned method is able to accelerate the verification procedure in the booting procedure if necessary. Furthermore, when the procedure for verifying the firmware image file can be accelerated, the calculation time of the system can be reduced and the power can also be saved. Especially for a system that requires multiple starting and closing processes, the effect of power saving can be more significant. Still further, when the method is applied to a more complicated system, e.g., a system such as a SoC with multiple booting procedures, the above-mentioned method achieves a more significant effect of acceleration.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for accelerating verification procedure for an image file, adapted to a system, comprising:
   during a booting procedure of the system, retrieving the image file from a first non-volatile memory that is an external storage device connected with the system, and performing a hash algorithm on all or a part of the image file so as to generate an image hash value;
   calculating a first authentication code according to combining the image hash value, a public key and a digital signature corresponding to the image file stored in the first non-volatile memory; and
   comparing the first authentication code with a second authentication code that is calculated according to a fast validation data constituted of a backup image hash value, a backup public key and a backup digital signature stored in a second non-volatile memory that is a non-volatile memory built in the system so as to produce a comparison result;
   wherein the public key is for verification of the digital signature, and the digital signature accompanied with the image file is used to verify whether or not the image file is from a trustworthy party;
   wherein, when the comparison result indicates that the image hash value, the public key and the digital signature stored in the first non-volatile memory and the backup image hash value, the backup public key and the backup digital signature stored in the second non-volatile memory are consistent, the image file is successfully verified without need of using the digital signature to verify the image file and the booting procedure of the system is allowed to load the image file for completely booting the system.

2. The method according to claim 1, wherein the backup image hash value, the backup public key and the backup digital signature is encrypted with a secret key and stored to the second non-volatile memory, when performing the comparison, the backup image hash value, the backup public key and the backup digital signature are retrieved from the second non-volatile memory through a decryption procedure.

3. The method according to claim 2, wherein the secret key is stored to a one-time programming memory of the system.

4. The method according to claim 3, wherein a public key hash value is generated from the public key through the hash algorithm, and the public key hash value is stored to the one-time programming memory; the public key hash value is used to verify the public key when the system needs to retrieve the public key in order to verify the digital signature.

5. The method according to claim 2, wherein the image file is an image of a firmware, a program or a file that is provided for the system to perform a procedure.

6. The method according to claim 1, wherein, if the comparison result indicates that the image hash value, the public key and the digital signature stored in the first non-volatile memory and the backup image hash value, the backup public key and the backup digital signature stored in the second non-volatile memory are inconsistent, a conventional procedure using the digital signature to verify the image file is performed.

7. The method according to claim 6, wherein, if the image file is successfully verified by the conventional verification procedure, the image file is loaded to the system, and the backup image hash value, the backup public key and the backup digital signature stored in the second non-volatile memory are updated.

8. A system applying a method for accelerating verification procedure for an image file, comprising:
   a processor; and
   a second non-volatile memory that is a non-volatile memory built in the system being used to store backup image hash values, backup public keys and backup digital signatures, wherein the backup public key is for verification of a digital signature, and the backup digital signature accompanying the image file is used to verify if the image file is from a trustworthy party;
   wherein the processor performs the method for accelerating verification procedure for the image file, the method including:
   during a booting procedure of the system, retrieving the image file from a first non-volatile memory that is an external storage device connected to the system, performing a hash algorithm on all or a part of the image file so as to generate an image hash value;
   calculating a first authentication code according to combining the image hash value, a public key and the digital signature corresponding to the image file stored in the first non-volatile memory; and
   comparing the first authentication code with a second authentication code that is calculated according to a fast validation data constituted of the backup image hash value, the backup public key and the backup digital signature stored in the second non-volatile memory so as to produce a comparison result;
   wherein, when the comparison result indicates that the image hash value, the public key and the digital signature stored in the first non-volatile memory and the backup image hash value, the backup public key and the backup digital signature stored in the second non-volatile memory are consistent, the image file is successfully verified without need of using the digital signature to verify the image file and the booting procedure of the system is allowed to load the image file for completely booting the system.

9. The system according to claim 8, wherein the backup image hash value, the backup public key and the backup digital signature is encrypted with a secret key and stored to the second non-volatile memory, when performing the comparison, the backup image hash value, the backup public key and the backup digital signature are retrieved from the second non-volatile memory through a decryption procedure.

10. The system according to claim 8, wherein the secret key is stored to a one-time programming memory of the system.

11. The system according to claim 10, wherein a public key hash value is generated from the public key through the hash algorithm, and the public key hash value is stored to the one-time programming memory; the public key hash value is used to verify the public key when the system needs to retrieve the public key in order to verify the digital signature.

12. The system according to claim 8, wherein the image file is an image of a firmware, a program or a file that is provided for the system to perform a procedure.

13. The system according to claim 12, wherein the system is an embedded system that includes a flash controller and the first non-volatile memory operates as an external flash memory connected to the system by the flash controller.

14. The system according to claim 13, wherein the embedded system is a system-on-chip coded with multiple booting procedures.

15. The system according to claim 8, wherein, in the method for accelerating verification procedure for image file, if the comparison result indicates that the image hash value, the public key and the digital signature stored in the first non-volatile memory and the backup image hash value, the backup public key and the backup digital signature stored in the second non-volatile memory are inconsistent, a conventional procedure using the digital signature to verify the image file is performed.

16. The system according to claim 15, wherein, if the image file is successfully verified by the conventional verification procedure, the image file is loaded to the system, and the backup image hash value, the backup public key and the backup digital signature stored in the second non-volatile memory are updated.

* * * * *